United States Patent [19]
Ekstrand

[11] Patent Number: 4,859,058
[45] Date of Patent: Aug. 22, 1989

[54] IMPROVED ADJUSTMENT MEANS FOR SIGHTING INSTRUMENT

[76] Inventor: Per-Olof S. Ekstrand, 2820 SE. 7th Ave., Ocala, Fla. 32671

[21] Appl. No.: 71,731

[22] Filed: Jul. 9, 1987

[51] Int. Cl.[4] .............................................. G02B 23/10
[52] U.S. Cl. ...................................... 356/251; 33/241
[58] Field of Search .................. 356/247, 251; 33/241; 350/566

[56] References Cited

U.S. PATENT DOCUMENTS 2,479,272 8/1949 Richards .............................. 356/251
3,942,901 3/1976 Ekstrand .............................. 356/251

Primary Examiner—Vincent P. McGraw
Assistant Examiner—S. A. Turner
Attorney, Agent, or Firm—Warren L. Franz

[57] ABSTRACT

A light dot reticle rifle shooting sight has tubular lens and battery housings supported in parallel for movement from right-handed to left-handed shooter positions by 90 degree rotation of a circumferential groove on the lens housing relative to a pin projecting into the groove from a mounting strap. Elevation and windage adjustments of the light dot are provided by adjustment screws that pivot a lens tube against diametrically opposed rubber biasing cushions and a coaxial position restoring force of a rubber ring fulcrum through which the tube extends. Rotation of the sight from right- to left-handed position interchanges the elevation and windage adjustment functions of the screws.

14 Claims, 2 Drawing Sheets

IMPROVED ADJUSTMENT MEANS FOR SIGHTING INSTRUMENT

This invention relates generally to optical sighting instruments and, in particular, to adjustable electronic optical sighting devices usable by action shooters and hunters for aiming light firearms.

BACKGROUND OF THE INVENTION

An example of a sighting instrument of the type to which the present invention relates is described in U.S. Pat. No. 3,942,901. A commercial implementation of the same is the Mark V sight available from Action Arms. That device comprises an electronic light dot reticle sight of relatively simple, lightweight construction that enables rapid and precise aiming of a firearm, even under low light conditions. The sight is of double-barreled side-by-side construction, with a tubular battery or circuitry housing supported by a brace or strut in spaced position adjacent a firearm mountable tubular lens housing.

The lens housing has front and rear apertures and contains a lens system having a rearwardly facing concave light reflecting surface that serves as a semi-transparent mirror to produce an image of a small electric light source. The semi-transparent mirror surface and the light source are arranged so that a dot point image will be perceived ahead of the mirror surface by an observer looking through the sight, to act as a sighting mark between the observer's eye and the target. The lens system is mounted in a tube supported within an angled channel of a rubber ring mounted in the lens housing. Vertical and horizontal positioning screws that contact the tube at points away from the ring, provide elevation and cross-angle or windage adjustment control for the sight by positioning the dot point image relative to the lens housing axis. The adjustment screws are marked in minute-of-angle increments, are coin turnable, and are shielded by protective dust covers. The angle of the channel causes the ring to bias the lens system tube against the dot positioning action of the screws.

The battery or circuitry housing has a removable cover at one end for replacement of two mercury cells that power the light source located in the lens housing. An on/off switch and intensity control for the light (and thus the dot image sighting mark) are provided at the other end of the battery housing in the form of a rotating knob rheostat. The lens housing is provided with strap brackets for mounting on a firearm, and the battery housing is joined in spaced position alongside the lens housing by a radially-directed supporting brace or strut. Electrical connection between the rheostat and power source in the battery housing and the light in the lens housing is established by wires running through the brace.

In a typical conventional configuration for a right-handed or right aiming shooter, the battery housing is located to the left of and slightly below the lens housing, with its longitudinal axis in the third quadrant at an angle of about 210 degrees of circle running counter-clockwise about a center on the longitudinal axis of the lens housing. Because of the housing placement and adjustment control arrangements of conventional optical sighting instruments of this type, separate embodiments are required for the left-handed or left-aiming shooter, or where firearm construction requires placement of the battery housing to the right of the lens housing.

SUMMARY OF INVENTION

The present invention provides an electronic sighting instrument having improved side-by-side circuitry housing/lens housing construction that permits readily changing the circuitry housing position relative to the lens housing from circuitry housing left to circuitry housing right position, and vice versa, in order to accommodate individual shooter preferences and firearm mounting requirements.

The invention also provides a sighting instrument of the type described, having elevation and transverse or cross-angle adjustment controls arranged so that their respective functions are interchanged when the circuitry housing position is changed relative to the lens housing—the cross-angle control taking over the function of the elevation control and the elevation control taking over the function of the cross-angle control.

The invention further provides an electronic sighting instrument having an improved lens system mounting and position biasing arrangement that gives superior shock resistance during shooting.

In one aspect of the invention, a sighting instrument has a tubular lens housing, containing a light source and a lens having a rearwardly-facing concave reflecting surface for generating a light point image of the light source to serve as a sighting mark, braced in spaced-apart position relative to a tubular power source circuitry housing, and has means for fixedly mounting the lens housing on a firearm. Means is provided for rotating the circuitry housing relative to the mounting means, to bring the sighting instrument from a right-handed shooter position in which the circuitry housing is located to the left of the lens housing (as seen from the shooter's perspective), to a left-handed shooter position in which the circuitry housing is located to the right of the lens housing. In a preferred configuration, discussed in detail below, the circuitry housing is movable from a position 45 degrees to the left and below the lens housing to a position in which it is 45 degrees to the right and below the lens housing, with shifting from one position to the other being guided by a pin projecting radially from a mounting strap down into a 90 degree arc running circumferentially of the lens housing.

In another aspect of the invention, a light reticle sighting instrument is provided with a light source and a rearwardly-facing concave reflecting surface for generating a light point image of the light source, located in a lens tube which is secured within an elastic ring mounted in a tubular lens housing. Adjustment screws protrude through the housing into contact with the lens tube for pivoting the lens tube relative to the ring to a desired position to give vertical elevation and horizontal adjustment of the light point image for windage sighting mark purposes. Means disposed between the lens tube and the lens housing at positions diametrically opposite the lens tube from the screw contact points, biases the tube against the pivoting action of the screws. In a preferred form, the biasing means is a block of elastic material, and the central opening of the elastic ring is coaxial with the lens housing to urge the lens tube into a coaxially aligned position within the lens housing.

Another aspect of the invention combines the foregoing features to give a sighting instrument which has elevation and windage adjustment controls whose functions are interchanged when the circuitry housing is brought from a right-handed to a left-handed shooter position, or vice versa.

A significant benefit of the invention is that manufacturers and retailers of sighting instruments of the kind described will only have to produce and stock a single version of each model, rather than both right- and left-handed versions as required with conventional designs; only a simple operation being required to convert sighting instruments according to the invention from right- to left-handed position, and vice versa. The invention also offers a lens mounting with superior shock resistance.

BRIEF DESCRIPTION OF THE DRAWINGS

Embodiments of the invention have been chosen for purposes of illustration and description, and are shown in the accompanying drawings, wherein.

Throughout the drawings, like elements are referred to by like numerals.

DESCRIPTION OF THE PREFERRED EMBODIMENTS

Figure 1:
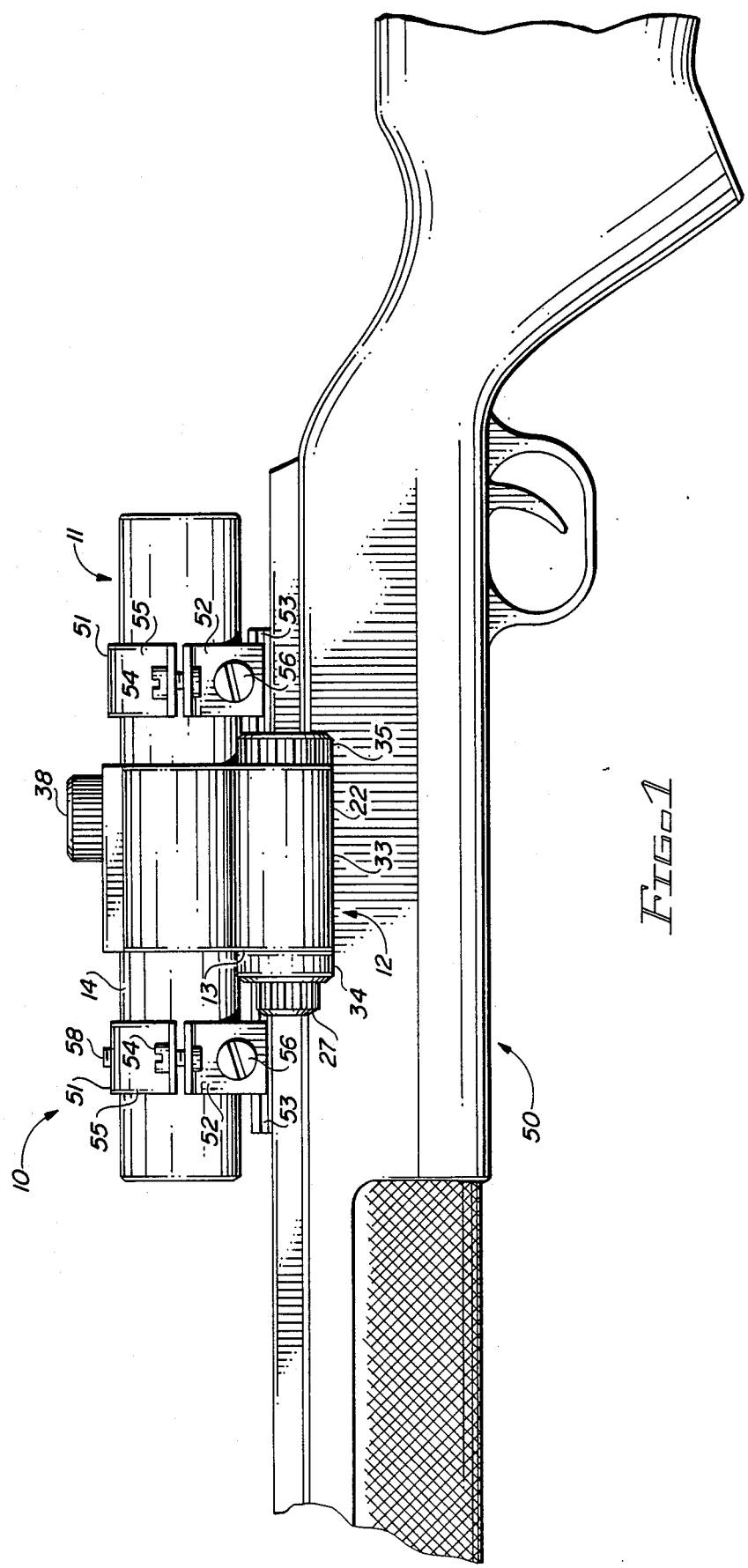
FIG. 1 is a side elevation view of a sighting instrument according to the principles of the invention, shown mounted on a hunting rifle in a position suitable for a right-handed shooter.
Figure 2:
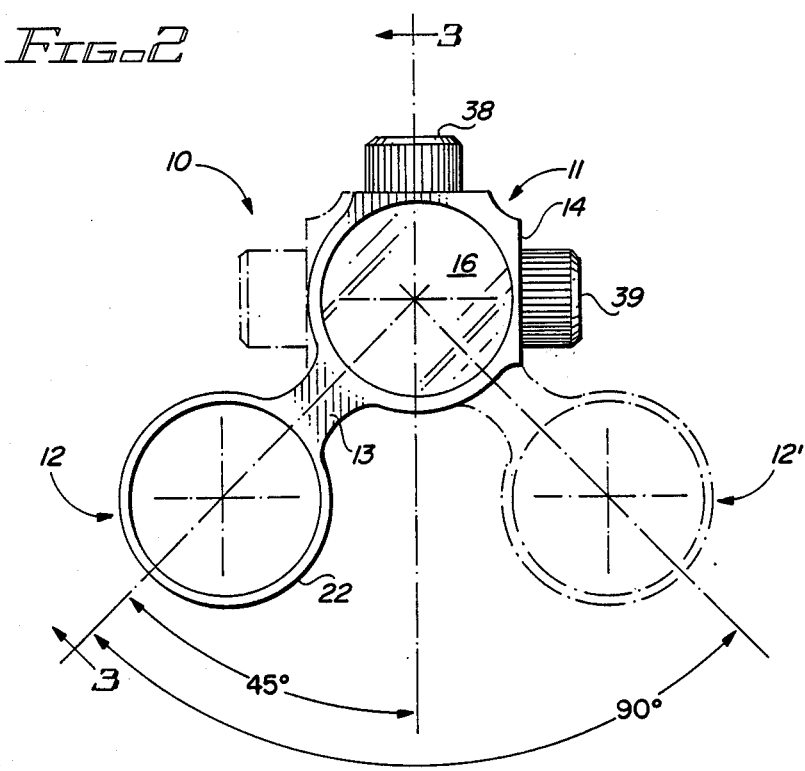
FIG. 2 is a front plan view of the sighting instrument of FIG. 1, not showing the rifle.
Figure 3:
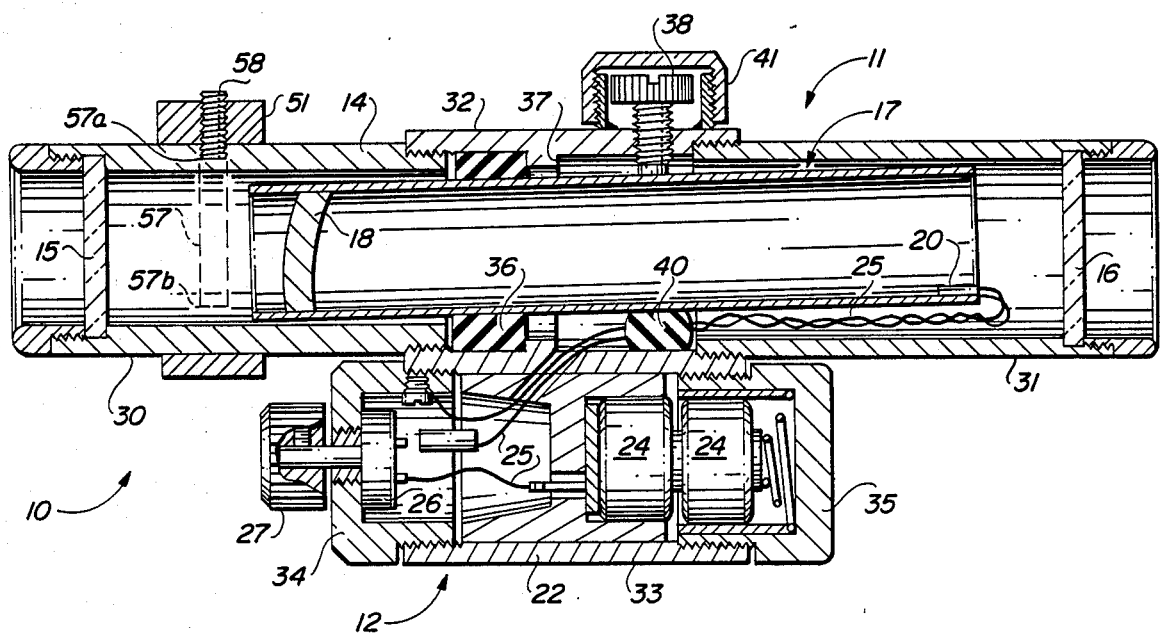
FIG. 3 is a schematic section view of the sighting instrument of FIGS. 1 and 2, taken along the line 3—3 in FIG. 2.

FIGS. 1-3 illustate an exemplary optical sighting instrument 10 having an optical device or lens member 11 connected in side-by-side spaced relationship to an electronic device or circuitry member 12 by means of a supporting brace or strut 13. The members 11 and 12 are elongated structures positioned with their longitudinal axes substantially in parallel.

The lens member 11 (see FIG. 3) comprises a tubular housing 14 having front and rear sight apertures 15, 16 and contains a lens system 17 in the form of a cylindrical tube which is disposed within the housing 14. The lens system 17 has a lens element with a concave light reflecting surface 18 mounted adjacent the front end thereof. The surface 18 serves as a semi-transparent mirror and faces the rear sight aperture 16. A small electric light source 20, preferably constituted by a light emitting diode (LED), is secured adjacent the rear end of the tube 17 at a position adjacent the inner periphery thereof. The concave surface 18 and light source 20 are relatively positioned and oriented so that light emitted from the light source 20 and directed to the semi-transparent mirror 18 will be reflected backwardly to generate, in a well-known manner, a virtual image of the light source 20 that will appear to an observer looking through the apertures 15, 16, from the rear to the front of the sight 10, as a light dot sighting mark located between the observer's eye and the target at a point ahead of the surface 18 along the longitudinal axis of the tubular housing 14.

The electronic circuitry member 12 comprises a tubular housing 22 within which is received an electric power source, such as a pair of small mercury cells 24, connected to power the light source 20. An on/off switch and intensity control for the light source 20 (and thus the dot point sighting mark image of the source 20) is provided by voltage control means, such as a rheostat 26 connected between the power source 24 and the light 20 by an electrical coupling 25. In well-known manner, the rheostat 26 is made adjustable by means of a knurled knob 27 accessible from the front end of the circuitry housing 22. The electrical coupling 25 comprises insulated connecting wires extending internally within the brace 13 through suitable openings in the walls of the circuitry housing 22 and lens housing 14 into the annular space between the inside of the housing 14 and the outside of the lens tube 17, and then into the rear of the tube 17 to the light source 20. The light source 20 is masked as needed to ensure a point source object for reflection by the mirror surface 18. Internal parts are given a matte finish and are shielded or otherwise prepared, as needed, to eliminate unwanted reflections of light from surfaces.

The lens housing 14 (FIG. 3) comprises front and rear tubular members 30, 31 which are coaxially joined, by threaded interengagement or other suitable means, to the ends of an intermediate tubular member 32. The circuitry housing 22 comprises an intermediate tubular section 33 to the front and rear ends of which are threadedly engaged front and rear end caps 34, 35, respectively, as shown. The end cap 35 is made manually removable for user replacement of the mercury cells 24. The brace 13 is preferably formed integrally with the intermediate member 32 and section 33 to extend radially therebetween.

The lens system tube 17 is mounted in the lens housing 14 with its forward portion secured within the central opening of a ring-shaped element 36 which is fixed to the inside wall of the intermediate member 32 at a location in the front portion of the lens member 11. Element 36 acts as a fulcrum about which the tube 17 can be pivoted for relocation of the dot image generated by the concave surface 18, to achieve the desired elevation and cross-angle or windage adjustment of the sighting instrument 10, as discussed further below.

The relative dimensions of the tube 17 and housing 14, and the positioning of the ring 36 with the housing 14, are such as to permit sufficient play between the rear end of the tube 17 and the inside of the housing 14 to allow the required extent of adjustment. In its preferred embodiment, the ring-shaped fulcrum 36 is a relatively short tubular element of an elastic material, such as rubber. As shown in FIG. 3, the front of the ring-shaped fulcrum 36 is in axial abutment with the back of the front member 30 of the lens housing 14. The rear of the ring 36 is in axial abutment against a shoulder 37 formed by a reduced inner diameter portion of the intermediate member 32. The ring 36 is coaxially aligned with the lens housing 14 to serve both as a sealing ring and as a precompressed bias to urge the lens system 17 into a rest position of coaxial alignment within the lens housing 14.

For elevation and cross-angle adjustment of the lens tube 17 relative to the longitudinal axis of the tubular housing 14, the sighting instrument 10 is furnished with a pair of adjusting screws 38, 39 (FIG. 2) mounted to project into threaded radial openings formed in the intermediate tubular member 32 at positions angularly-spaced from each other by 90 degrees and in a transverse plane axially-spaced from the fulcrum 36. The inner ends of the adjusting screws 38, 39 engage the outer wall of the lens tube 17 at correspondingly angularly-spaced positions, and function in accordance with the extent of their respective projections to pivot the tube 17 against the bias of and about the support formed by the ring-shaped fulcrum 36, for adjustment of the perceived position of the virtual image of the light source 20 in relation to vertical and horizontal axes.

A further biasing means 40 is mounted between the outside of the lens system tube 17 and the inside of the lens housing 14, in diametrically opposed positions relative to each one of the adjusting screws 38, 39 (see FIG. 3). The biasing means 40 preferably takes the form of blocks or cushions of elastic material, such as rubber, positioned opposite each screw 38, 39 and is precompressed to urge the tube 17 about the fulcrum 36 toward the adjusting screws 38, 39. Thus, the elevation and windage adjustments of the optical sighting device 10 are effected by projecting the screws 38, 39 to pivot the tube 17 about the fulcrum 36 against the force of the biasing means 40, as well as against the restoring force from the fulcrum ring 36 itself. As a result of the positions of the biasing means 40 exactly on the longitudinal axes of the respective adjusting screws 38, 39, any oblique load on the elastic fulcrum 36, which would have a disturbing effect on the scalar deviation of the point of impact of bullets from a rifle as a result of adjustments made by means of the adjusting screws, is eliminated. For convenience to the shooter, screws 38, 39 are made coin-turnable and are protected by dust covers 41 (FIG. 3).

FIG. 1 shows the described sighting instrument embodiment 10 mounted on a rifle 50 having a mechanism, such as a bolt action (not shown), adapted to be operated by right-handed shooters to eject shells in a right direction from the rifle. In this position, the electronic device or circuitry member 12 is situated, as shown by solid lines in FIG. 2, with its longitudinal axis in the third quadrant at an angle of about 225 degrees of a circle running counterclockwise about a center located along the longitudinal axis of the lens member 11, i.e., to the left and below the lens member 11. In the left side mounted position of the circuitry member 12, a plane containing the longitudinal axes of the lens and circuitry members 11, 12 forms an angle of approximately 45 degrees with a vertical plane containing the axis of the lens member 11. In this position the electronic device 12 will not disturb ejection of shells from the rifle and will not hide the view of a so-called right-aiming shooter.

The sighting instrument 10 (FIG. 1) is secured to the rifle 50 by seating elements 51. A seating element 51 is located at each end of the outside of lens housing 14, and comprises a pair of brackets 52 which are arranged for dovetail engagement with a bar 53 fixed to the rifle 50, and a semi-circular strap 55 which goes around the top of the outside of housing 14. The strap 55 is clamped to the brackets 52 by means of clamping screws 54 that extend through aligned openings in radially outwardly bent ends of the strap 55 and in similarly bent ends of the brackets 52. Clamping screws 56 secure the brackets 52 on the bar 53.

In the relative positions of the adjusting screws 38, 39 shown by solid lines in FIG. 2 (which correspond to the positions according to FIG. 1), the adjusting screw 38 disposed at the top of the lens member 11 serves as the elevational or vertical adjustment control and the adjusting screw 39 disposed at the right side of the member 11 serves as a cross-angle or horizontal adjustment control. According to the invention, however, the sighting instrument 10 is arranged to be rotatable in the seating 51 between a first right-handed shooting position shown by solid lines in FIG. 2, and a second left-handed shooting position shown by broken lines in FIG. 2. In the first position, the circuitry member 12 is located 45 degrees to the left and below the lens member 11 as previously described. In the second position 12', the circuitry member 12 has been rotated counterclockwise by 90 degrees to be located 45 degrees to the right and below the lens member 11. The second position of the sighting instrument 10 is suitable for mounting the instrument on a rifle adapted to be operated by left-handed and left-aiming shooters. In the second position of the circuitry member 12, the elevational adjusting screw 38 is moved to the left side of the lens member 11 to serve as a cross-angle adjusting screw in a position easily operable by left-handed persons. The former cross-angle adjusting screw 39 is moved to a position at the top of the lens member 11 to serve as an elevational adjusting screw.

In a preferred embodiment according to the invention, the first and second angularly-spaced end positions described above are definable by cooperating stop means which includes a stop pin 58 (FIGS. 1 and 3) supported by the strap 55 of seating element 51 that fits within a recess or groove 57 formed circumferentially partially about the outer periphery of the front of housing 14. The stop pin 58 is shown in the form of a threaded pin that extends radially through a threaded opening in the front strap 55 so that its inner end is captured for riding engagement within the groove 57 along an arc of 90 degrees from a first position end point 57a, wherein the instrument 10 is in the solid line position of FIG. 2, to a second position end point 57b wherein the instrument 10 is in the broken line position of FIG. 2.

To rotate the sight 10 by 90 degrees, as described, the clamping screws 54 are first loosened. The sight is then rotated to move one or the other of the opposite ends 57a, 57b of the groove 57 into stop engagement with the stop pin 58. To secure the sighting instrument 10 in the desired first or second position thus achieved, the clamping screws 56 are then retightened.

It will be understood that other equivalent means for locking a pair of relatively angularly moveable elements in relation to one other may be used instead of the means described above, to achieve the same result. For example, the means for defining the angularly spaced alternative end positions of the sighting instrument 10 within the seatings 51 (FIG. 1) can be accomplished using a pair of axial grooves or recesses formed on the outer surface of housing 14 at positions which are angularly spaced by 90 degrees. In such case, the stop pin 58 for cooperation with the spaced grooves or recesses (not shown) is replaced by a pair of splines or a locking screw.

The above description and the accompanying drawings thus illustrate that the invention provides an improved optical sighting instrument that is readily changeable, by simple operations, from a sighting instrument suitable for rifles having a mechanism intended to be operated by right-handed shooters, to a sighting instrument suitable for rifles having a mechanism adapted for left-handed shooters, and vice versa.

By arranging a graduated scale for elevational as well as for cross-angle adjustments of the sighting instrument near the head of each one of the adjusting screws 38, 39, the user will have a convenient reference for making the correct adjustments in both right- and left-handed shooting orientations.

It is to be understood that the foregoing description is given merely by way of example, and not by way of limitation, and it will be recognized by those skilled in the technology to which the invention relates that various substitutions and modifications may be made to the foregoing embodiments, without departing from the full spirit and scope of the invention as described by the claims.

What is claimed is:

1. An optical sighting instrument, comprising:
   a tubular lens housing having front and rear apertures;
   a lens mounted within said lens housing and having a concave light reflecting surface facing said rear aperture;
   a light source located within said lens housing and relative to said concave surface so as to generate a light point image viewable as a sighting mark at a point ahead of said surface by an observer looking through the sighting device from said rear to said front aperture;
   means for fixedly mounting said lens housing to a firearm;
   a tubular circuitry housing;
   means connecting a power source received within said circuitry housing to said light source in said lens housing;
   bracing means supporting said circuitry housing at a fixed position spaced from said lens housing; and
   means for rotating said circuitry housing relative to said mounting means, while maintaining its fixed position relative to said lens housing, from a first position in which the circuitry housing is located to the left of said lens housing, as seen from the rear aperture, to a second position in which the circuitry housing is located to the right of said lens housing.

2. An instrument as in claim 1, further comprising means for adjusting the positions of said concave surface and said light source to provide vertical adjustment of said light point image relative to a longitudinal axis of said lens housing, and means for adjusting the positions of said concave surface and said light source to provide a horizontal adjustment of said light point image relative to said lens housing axis, thereby providing elevation and windage adjustment capability for said sighting mark.

3. An instrument as in claim 2, wherein said means for rotating said circuitry housing relative to said mounting means comprises means for rotating the mounted position of the instrument from a first position in which a bracing plane containing the longitudinal axes of said circuitry housing and said lens housing is oriented at an angle of 45 degrees to the left of a vertical plane containing the longitudinal axis of said lens housing, to a second position in which said bracing plane is oriented at an angle of 45 degrees to the right of said vertical plane; and wherein rotation of said instrument from said first to said second position interchanges the functions of said vertical and horizontal adjustment means.

4. An instrument as in claim 3, further comprising an elastic ring mounted coaxially within said lens housing, and a lens tube received within said lens housing and having a front end facing said front aperture, a forward portion and a rearward portion, one of said portions being secured within said ring, and a rear end facing said rear aperture; and wherein said lens is mounted near the front end on said lens tube, said light source is mounted near the rear end of said tube, and said vertical and horizontal adjustment means each comprises an adjustment screw threaded radially into said lens housing and having a protruding end that contacts the other of said forward and rearward portions of said lens tube, thereby causing said lens tube to pivot to a desired position about said ring.

5. An instrument as in claim 4, wherein each adjustment screws are angularly-spaced relative to one another about said lens housing by an angle of 90 degrees, and wherein said instrument further comprises a block of elastic material received in a space between said lens tube and said lens housing in positions diametrically opposite said lens tube from the points of contact of said protruding ends of said adjustment screws.

6. An instrument as in claim 5, wherein a central opening of said elastic ring is coaxial with said lens housing axis, and said ring acts to bias said lens tube into a coaxially aligned position relative to said lens housing; and wherein said block of elastic material acts to bias said lens tube against the pivotal movement about said ring caused by said adjustment screws.

7. An instrument as in claim 1, wherein said means for mounting said lens housing to a firearm comprises a strap member at least partially encircling said lens housing; and wherein said rotating means comprises a groove formed in the outside of said lens housing adjacent said strap and a pin projecting from said strap into said groove.

8. An instrument as in claim 7, wherein said groove runs circumferentially for an arc of 90 degrees about said lens housing and said pin can be moved from a first stop position at an end of said groove to a second stop position at another end of said groove.

9. An optical sighting instrument, comprising:
   a tubular lens housing having front and rear apertures;
   an elastic ring mounted within said lens housing;
   a lens tube received within said lens housing and having a front end facing said front aperture, a forward portion and a rearward portion, one of said portions being secured within said ring, and a rear end facing said rear aperture;
   a lens mounted near the front end of said lens tube and having a rearwardly facing concave light reflecting surface;
   a light source mounted near said rear end of said lens tube; said lens tube, concave surface and light source being relatively configured and positioned so as to generate a light point image viewable as a sighting mark at a point ahead of said surface by an observer looking through the sighting instrument from said rear to said front aperture;
   means for pivoting the other of said forward and rearward portions of said lens tube in a vertical plane about a fulcrum provided by said ring to provide a vertical adjustment of said light point image relative to a longitudinal axis of said lens housing, thereby providing elevation adjustment capability for said sighting mark; and
   means for pivoting said other portion of said lens tube in a horizontal plane about the fulcrum provided by said ring to provide a horizontal adjustment of said light point image relative to said longitudinal axis of said lens housing, thereby providing windage adjustment capability for said sighting mark;
   said vertical and horizontal adjustment means each comprising an adjustment screw threaded radially into said lens housing and having a protruding end that contacts said other portion of said lens tube, and means disposed in contact between said lens tube and said lens housing at a position diametrically opposite said lens tube from said point of contact of said protruding end for biasing said tube against the pivoting action of said adjustment screw.

10. An instrument as in claim 9, wherein said biasing means comprises a block of elastic material, precompressed to urge said tube about said fulcrum towards said adjustment screw.

11. An instrument as in claim 10, wherein a central opening of said elastic ring is coaxial with said lens housing axis and wherein said ring acts to bias said lens tube into a coaxially aligned position relative to said lens housing.

12. An optical sighting instrument, comprising:
a tubular lens housing having front and rear apertures;
an elastic ring mounted within said lens housing;
a lens tube received within said lens housing and having a front end facing said front apertures, a forward portion and a rearward portion, one of said portions being secured within said ring, and a rear end facing said rear aperture;
a lens mounted near the front end of said lens tube and having a rearwardly facing concave light reflecting surface;
a light source mounted near the rear end of said lens tube; and lens tube, concave surface and light source being relatively configured and positioned so as to generate a light point image viewable as a sighting mark at a point ahead of said surface by an observer looking through the sighting instrument from said rear to said front aperture;
means for pivoting the other of said forward and rearward portions of said lens tube in a vertical plane about a fulcrum provided by said ring to provide a vertical adjustment of said light point image relative to a longitudinal axis of said lens housing, thereby providing elevation adjustment capability for said sighting mark;
means for pivoting said other portion of said lens tube in a horizontal plane about the fulcrum provided by said ring to provide a horizontal adjustment of said light point image relative to said longitudinal axis of said lens housing, thereby providing windage adjustment capability for said sighting mark;
said vertical and horizontal adjustment means each comprising an adjustment screw threaded radially into said lens housing and having a protruding end that contacts said other portion of said lens tube, and means disposed in contact between said lens tube and said lens housing at a position diametrically opposite said lens tube from said point of contact of said protruding end for biasing said tube against the pivoting action of said adjustment screw;
means for fixedly mounting said lens housing to a firearm;
a tubular circuitry housing;
means connecting a power source received within said circuitry housing to said light source in said lens housing;
a brace extending radially between said lens housing and said circuitry housing, and supporting said circuitry housing in parallel, spaced position relative to said lens housing; and
means for rotating said circuitry housing by 90 degrees relative to said mounting means from a first position in which the circuitry housing is located to the left of said lens housing, as seen from the rear aperture, to a second position in which the circuitry housing is located to the right of said lens housing so that rotation of said instrument from said first to said second position interchanges the functions of said vertical and horizontal adjustment means screws.

13. An instrument as in claim 12, wherein said means for rotating said circuitry housing relative to said mounting means comprises means for rotating the mounted position of the instrument from a first position in which a bracing plane containing the longitudinal axes of said circuitry housing and said lens housing is oriented at an angle of 45 degrees to the left of a vertical plane containing the longitudinal axis of said lens housing, to a second position in which said bracing plane is oriented at an angle of 45 degrees to the right of said vertical plane; and said biasing means comprises a block of elastic material; and wherein a central opening of said elastic ring is coaxial with said lens housing axis and said ring acts to bias said lens tube into a coaxially aligned position relative to said lens housing.

14. An instrument as in claim 13, wherein said means for mounting said lens housing to a firearm comprises a strap member at least partially encircling said lens housing; and wherein said rotating means comprises a groove formed circumferentially along an arc of 90 degrees in the outside of said lens housing, and a pin projecting from said strap into said groove for movement from a first stop position at an end of said groove to a second stop position at another end of said groove.

* * * * *